(12) United States Patent
Watanabe

(10) Patent No.: US 7,931,771 B2
(45) Date of Patent: Apr. 26, 2011

(54) METHOD OF MANUFACTURING PLASMA DISPLAY DEVICE

(75) Inventor: Hiroshi Watanabe, Yawata (JP)

(73) Assignee: Panasonic Corporation, Osaka (JP)

( * ) Notice: Subject to any disclaimer, the term of this patent is extended or adjusted under 35 U.S.C. 154(b) by 392 days.

(21) Appl. No.: 10/535,266

(22) PCT Filed: Apr. 1, 2004

(86) PCT No.: PCT/JP2004/004781
§ 371 (c)(1),
(2), (4) Date: May 16, 2005

(87) PCT Pub. No.: WO2004/090848
PCT Pub. Date: Oct. 21, 2004

(65) Prior Publication Data
US 2006/0005922 A1 Jan. 12, 2006

(30) Foreign Application Priority Data

| Apr. 2, 2003 | (JP) | ................. 2003-099087 |
| Apr. 2, 2003 | (JP) | ................. 2003-099088 |
| Apr. 2, 2003 | (JP) | ................. 2003-099089 |
| Apr. 2, 2003 | (JP) | ................. 2003-099091 |
| Apr. 2, 2003 | (JP) | ................. 2003-099092 |
| Apr. 2, 2003 | (JP) | ................. 2003-099093 |
| Apr. 2, 2003 | (JP) | ................. 2003-099094 |

(51) Int. Cl.
*B32B 38/10* (2006.01)

(52) U.S. Cl. ........ 156/247; 156/295; 156/347; 313/283; 313/326

(58) Field of Classification Search .................. 156/344, 156/94, 295, 247; 349/187; 313/283, 326
See application file for complete search history.

(56) References Cited

U.S. PATENT DOCUMENTS 6,054,198 A * 4/2000 Bunyan et al. ............... 428/40.5
6,347,415 B1 * 2/2002 Hogue ............................. 4/234
(Continued)

FOREIGN PATENT DOCUMENTS

EP 0 821 385 A2 1/1998
(Continued)

OTHER PUBLICATIONS

Kaneko et al., Machine tranlsation of JP 2002268577, drawings pp. 1-2 and detailed description pp. 1-5.*

(Continued)

*Primary Examiner* — Richard Crispino
*Assistant Examiner* — Christopher Schatz
(74) *Attorney, Agent, or Firm* — RatnerPrestia

(57) ABSTRACT

Here disclosed is a method of manufacturing a plasma display device in which a panel is easily separated from a holding plate if the separation is required. In the method of manufacturing a plasma display device having a panel, in which a pair of substrates having transparency at least on the front side is oppositely disposed so that discharge space and discharge cells are formed between the substrates, and a metallic holding plate that supports the panel via a thermal conductive member, the present invention employs a thermal conductive member made of a pull-to-remove adhesive. The adhesive is applied to the panel or the holding plate, and the panel and the holding plate are put together. After that, the adhesive is cured by application of pressure and heat.

5 Claims, 10 Drawing Sheets

U.S. PATENT DOCUMENTS

| | | | |
|---|---|---|---|
| 6,366,264 B1 * | 4/2002 | Kurumada | 345/60 |
| 6,479,563 B1 * | 11/2002 | Liebing et al. | 522/13 |
| 6,496,373 B1 * | 12/2002 | Chung | 361/705 |
| 6,847,415 B1 * | 1/2005 | Yoshimura et al. | 349/58 |
| 2001/0005308 A1 * | 6/2001 | Oishi et al. | 361/687 |
| 2002/0127363 A1 | 9/2002 | Kaneko et al. | |
| 2002/0193035 A1 * | 12/2002 | Wei et al. | 445/22 |
| 2003/0025427 A1 * | 2/2003 | Kim et al. | 313/46 |

FOREIGN PATENT DOCUMENTS

| | | |
|---|---|---|
| JP | 10-172446 A | 6/1998 |
| JP | 10-254372 A | 9/1998 |
| JP | 11-343468 A | 12/1999 |
| JP | 2000-011271 A | 1/2000 |
| JP | 2000-281982 A | 10/2000 |
| JP | 2001-293464 A | 10/2001 |
| JP | 2001-348542 A | 12/2001 |
| JP | 2002-508487 A | 3/2002 |
| JP | 2002-123186 A | 4/2002 |
| JP | 2002-518578 A | 6/2002 |
| JP | 2002-268577 A | 9/2002 |
| JP | 2002-313237 A | 10/2002 |
| JP | 2002-323863 A | 11/2002 |
| JP | 2003-29662 A | 1/2003 |
| JP | 2003-31980 A | 1/2003 |
| JP | 2003-507562 A | 2/2003 |
| JP | 2003-507563 A | 2/2003 |
| WO | WO 01/12644 A1 | 3/2000 |
| WO | WO 01/53422 A1 | 7/2001 |
| WO | WO 2004/013885 A2 | 2/2004 |

OTHER PUBLICATIONS

International Search Report for application No. PCT/JP2004/004781 dated May 18, 2004.

Supplementary European Search Report for PCT/JP2004004781 dated Mar. 20, 2009.

* cited by examiner

METHOD OF MANUFACTURING PLASMA DISPLAY DEVICE

This Application is a U.S. National Phase Application of PCT International Application PCT/JP2004/004781.

TECHNICAL FIELD

The present invention relates to a method of manufacturing a plasma display device with a large screen and low-profile, lightweight body.

BACKGROUND ART

A plasma display device has recently been drawing attention as a low-profile display device with excellent visual recognition. Higher resolution and larger screen of the device is now in increasing demand.

The plasma display devices are divided, in terms of the principles of driving, into two types of the alternating current (AC) type and the direct current (DC) type. From the difference in discharging, the plasma display devices fall into the surface discharge type and the opposing discharge type. In recent years, the dominating plasma display device is the AC surface discharge plasma display device by virtue of its easy fabrication and suitability for higher resolution.

In the manufacturing process of the plasma display device, the panel, which is mainly made of glass, and the holding plate, which forms chassis members and is made of aluminum or other metal, are usually fixed with double-sided adhesives made of an acrylic-based, polyurethane-based, or silicon-based material, or otherwise, fixed through a thermal conductive sheet.

The panel and the chassis member should be securely attached with no fallout during transportation and in operation. Besides, for an efficient transmission of heat generated in the panel to the chassis member, the panel and the chassis member should be tightly bonded with each other.

On the other hand, when the display device falls into unrecoverable conditions due to some troubles, the metallic chassis member and the glass panel have to be separated for recycling.

The panel and the chassis member, as described above, has a secure bonding so as not to fall apart during transportation and in operation. Also in the case that a thermal conductive sheet is employed, the panel and the chassis member maintain an intimate contact for efficiency of thermal conduction. Therefore, to remove the panel from the chassis member, the glass-made panel is broken into pieces and then the glass pieces left on the chassis member have to be carefully removed with a scraper and the like. The removing process has been performed at much expense in time and effort.

DISCLOSURE OF THE INVENTION

In the method of manufacturing a plasma display device having a panel—in which a pair of substrates having transparency at least on the front side is oppositely disposed so that discharge space and discharge cells are formed therebetween—and a metallic holding plate that supports the panel via a thermal conductive member, the present invention employs a thermal conductive member made of a pull-to-remove type adhesive. The adhesive is applied to the panel or the holding plate, and the panel and the holding plate are put together. After that, the adhesive is cured by the application of pressure and heat.

DETAILED DESCRIPTION OF CARRYING OUT OF THE INVENTION

The exemplary embodiments of the present invention are described hereinafter with reference to the accompanying drawings.

First Exemplary Embodiment

Referring to FIG. 1 through FIG. 8, the method of manufacturing a plasma display device of the invention will be described. The descriptions hereinafter will be given by way of example and without limitation.

Figure 1:
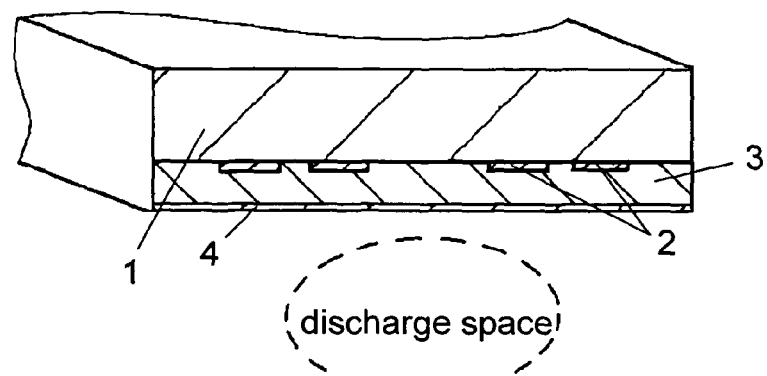
FIG. 1 shows a structure of a panel of a plasma display device of a first exemplary embodiment of the present invention.
Figure 1:
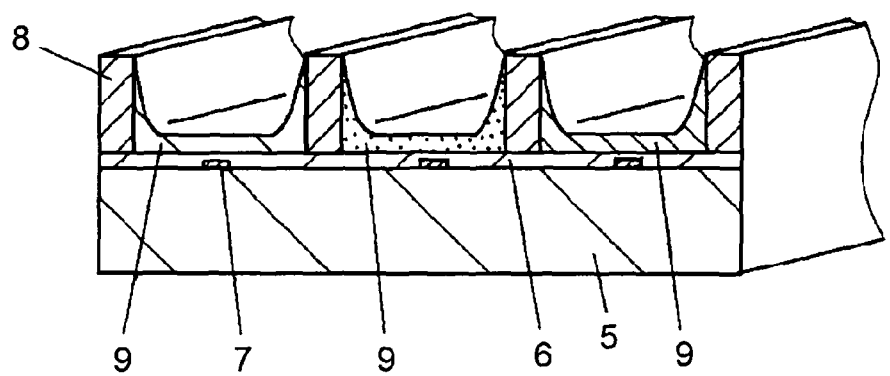

FIG. 1 shows the structure of the panel of a plasma display device of a first exemplary embodiment of the present invention. On front-side transparent substrate 1 made of glass or the like, as shown in FIG. 1, a plurality of rows of display electrodes 2—made of pairs of the scan electrode and the sustain electrode—is formed in a stripe-shaped arrangement. The array of the electrodes is covered with dielectric layer 3, and over which, protecting film 4 is disposed.

On the other hand, on back-side substrate 5 confronting front-side substrate 1, a plurality of rows of data electrodes 7 is disposed so as to be orthogonal to the scan electrodes and sustain electrodes, i.e., display electrodes 2. Data electrodes 7 are covered with overcoat layer 6, and further on which, a plurality of barrier ribs 8 is formed parallel to data electrodes 7. Phosphor layer 9 is disposed on the sidewalls of barrier ribs 8 and the surface of overcoat layer 6 divided by barrier ribs 8.

Substrate 1 and substrate 5 are oppositely disposed via a narrow discharge space so that display electrodes 2 (i.e., the scan electrodes and the sustain electrodes) are substantially orthogonal to data electrodes 7, and then the two substrates are sealed with each other. The discharge space is filled with a gas containing any one of helium, neon, argon, and xenon, or the mixture of them. Barrier ribs 8 divide the discharge space into a plurality of discharge cells, each of which contains the intersection point of display electrode 2 and data electrode 7. Each discharge cell contains phosphor layer 9 one by one in color, in the order of red, green, and blue.

Figure 2:
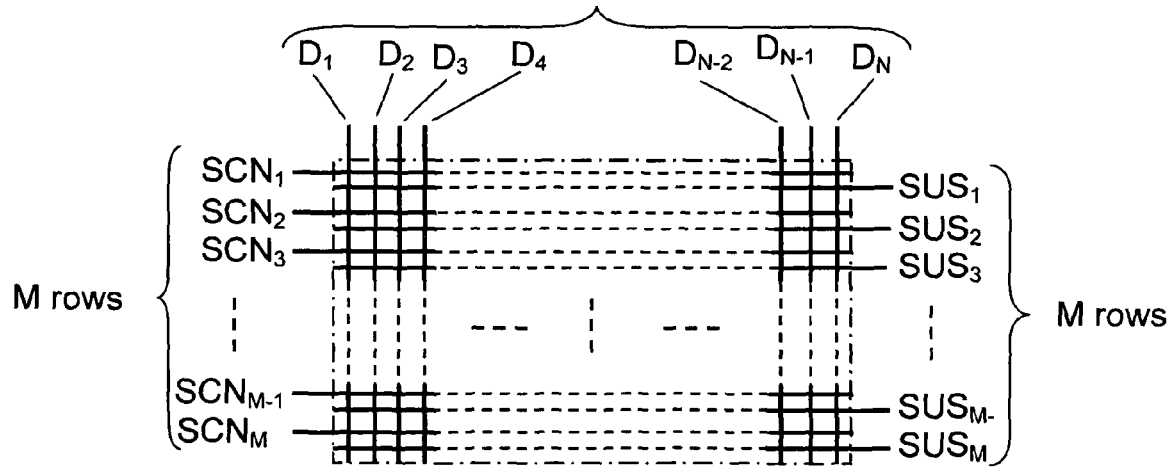
FIG. 2 shows arrangement of electrodes disposed on the panel.

FIG. 2 shows the arrangement of the electrodes disposed on the panel. As shown in FIG. 2, the scan electrodes, sustain electrodes, and data electrodes 7 form a M×N matrix structure. M scan electrodes $SCN_1$-$SCN_M$ and M sustain electrodes $SUS_1$-$SUS_M$ are disposed in the direction of rows; on the other hand, N data electrodes $D_1$-$D_N$ are disposed in the direction of columns.

In the plasma display panel having the electrode structure above, an address pulse is applied between data electrodes 7 and the scan electrodes to cause an address discharge between the two electrodes. Through the address discharge, the discharge cells to be tuned ON are selected. Subsequently, applying alternately reversing sustain pulses between the scan electrodes and the sustain electrodes to cause a sustain discharge, whereby an intended image is shown on the panel.

Figure 3:
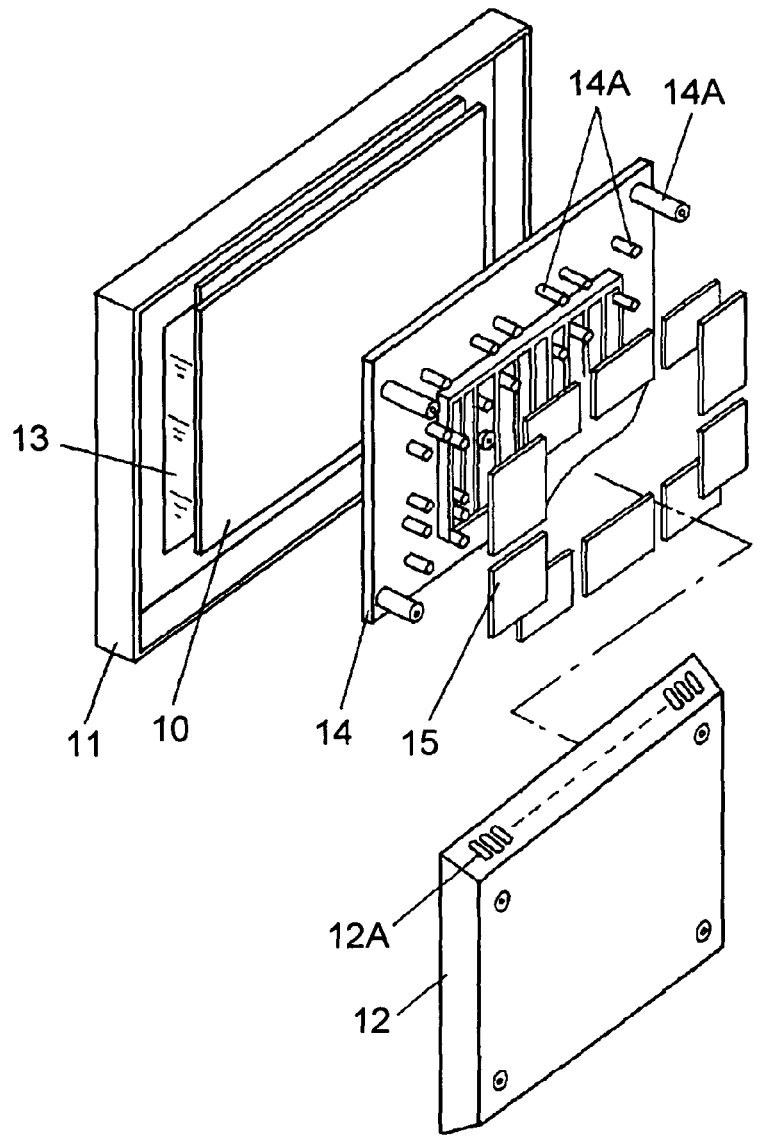
FIG. 3 shows an example of an entire structure of the plasma display device having the panel.

FIG. 3 shows an example of an entire structure of the plasma display device having the panel structured above. In FIG. 3, the case for accommodating panel 10 is formed of front frame 11 and metallic back cover 12. Front cover 13 is fixed at the opening of front frame 11. Made of glass or the like, front cover 13 doubles an optical filter and a protector of panel 10. To suppress undesired radiation, for example, silver evaporation is provided on front cover 13. On the other hand, a plurality of ventilation holes 12A is formed in back cover 12 to let the heat generated in panel 10 escape outside.

Chassis member 14, which is made of aluminum or the like, holds panel 10 and also serves as a cooling plate for the panel. Panel 10 is fixed to chassis member 14 via pull-to-remove adhesive (not shown) having thermal conductivity provided at the front surface of chassis member 14. On the backside of chassis member 14, a plurality of circuit blocks 15 for driving the display of panel 10 is disposed. The thermal conductive adhesive effectively carries heat generated in panel 10 to chassis member 14 to dissipate the heat. Circuit blocks 15 contain an electric circuit responsible to driving and controlling the display of panel 10. The electric circuit is electrically connected to the electrode-lead out section extended to the edge of panel 10 through a plurality of flexible wiring boards (not shown) extending across the four sides of chassis member 14.

In addition, chassis member 14 has bosses 14A that extend from the back surface of chassis member 14. Bosses 14A, which are integrally formed on chassis member 14 by die casing or the like, are used for fixing circuit blocks 15 and back cover 12. Chassis member 14 may be formed of an aluminum plate having fixed pins thereon.

Figure 4:
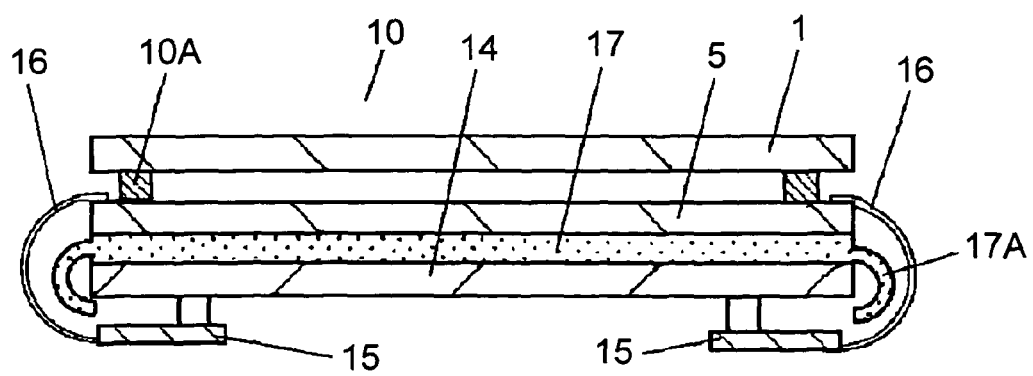
FIG. 4 is a section view illustrating a bonded structure of the plasma display device.
Figure 5:
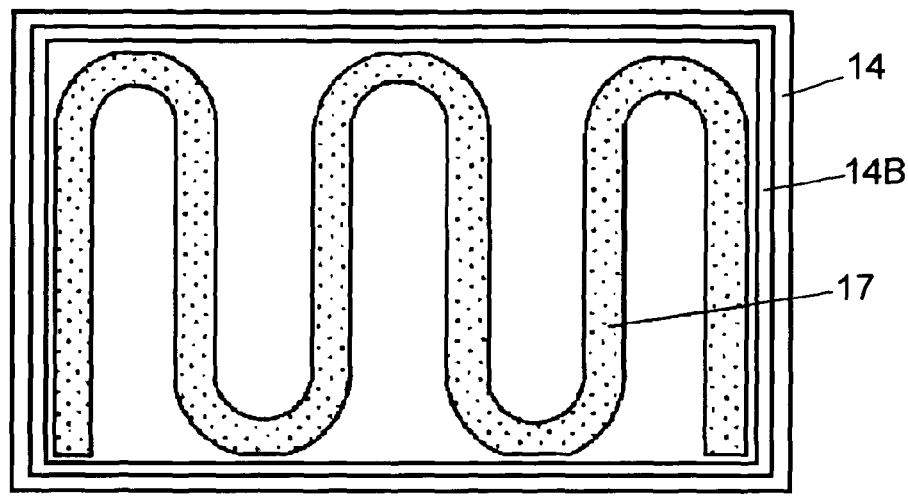
FIG. 5 is a plan view showing an adhesive provided at the plasma display device.
Figure 6A:
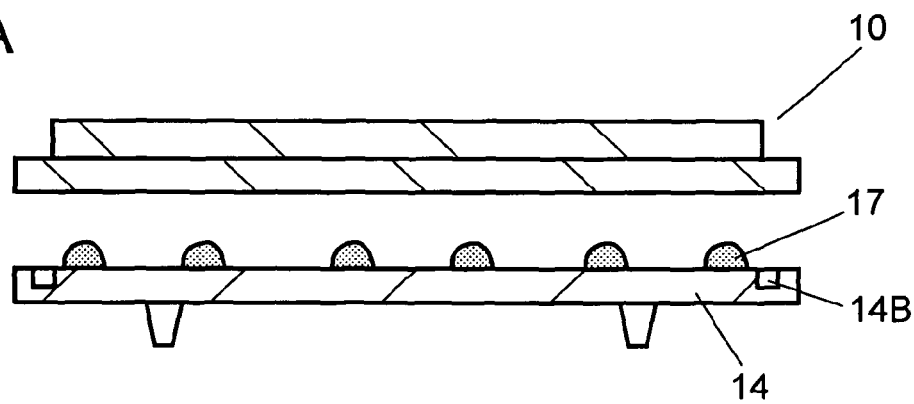
FIG. 6A is a section view showing a positional condition of the adhesive provided in the plasma display device before bonding.
Figure 6B:
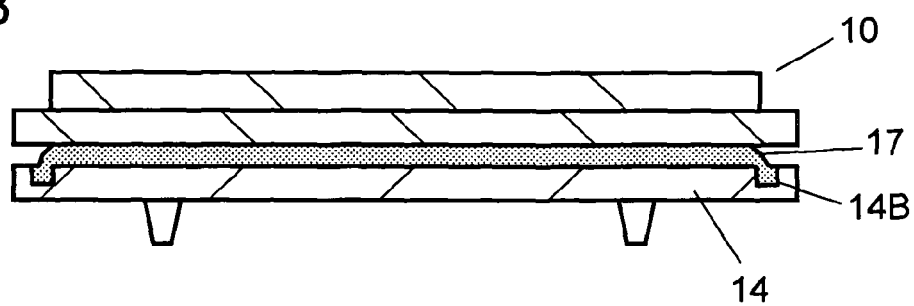
FIG. 6B is a section view showing a positional condition of the adhesive provided in the plasma display device after bonding.

FIG. 4 is a section view illustrating a bonded structure of the plasma display device of the first embodiment. FIG. 5 is a plan view showing the adhesive provided at the plasma display device. FIG. 6A is a section view showing a positional condition of the adhesive provided in the plasma display device before bonding, and, FIG. 6B is a section view showing a positional condition of the adhesive provided in the plasma display device after bonding.

In FIG. 4, panel 10 is formed of substrate 1 as the front panel and substrate 5 as the rear panel in such a way that the perimeter sections of the two substrates are sealed with sealing material 10A made of frit glass. Flexible wiring boards 16 connect between panel 10 and circuit blocks 15.

Panel 10 is fixed to chassis member 14 via pull-to-remove adhesive 17 made of acrylic-based, or silicon-based synthetic resin material with good thermal conductivity. Having a considerable flexibility and a pressure-sensitive adhesive layer, adhesive 17 is widely used; with adhesive 17, for example, a hook, and a clothes hanger are removably attached on a wall. To fix panel 10 to chassis member 14, adhesive 17 is provided between panel 10 and chassis member 14 and then cured by the application of pressing force. To remove panel 10 from chassis member 14, applying a pulling force to adhesive 17 causes distortion in a widthwise direction of adhesive 17. The distortion considerably decreases the adhesive force, so that the adhesive comes off. Adhesive 17 may be formed of a flexible base material having pressure sensitive adhesive layers on both surfaces, or formed of the pressure sensitive adhesive layer alone.

Adhesive 17 is applied in a serpentine shape, as shown in FIG. 5, between panel 10 and chassis member 14. Besides, adhesive 17 is provided so that a portion of the adhesive—exposed tabs 17A with few millimeters to few centimeters in length—comes out from the bounded edges of panel 10 and chassis member 14. To separate panel 10 from chassis member 14, as shown in FIG. 4, pulling tabs 17A weakens the adhesion of adhesive 17, whereby panel 10 can be easily separated from chassis member 14.

Furthermore, as shown in FIGS. 6A and 6B, groove 14B, into which a part of adhesive 17 flows, is disposed around chassis member 14. When panel 10 is put onto chassis member 14 after adhesive 17 is applied to the chassis member 14, as shown in FIG. 6A, the serpentine shape of the adhesive becomes flat by the pressing force, and ,as shown in FIG. 6B, a portion of adhesive 17 comes close to the edges of chassis member 14. Groove 14B accepts the portion of adhesive 17 and prevents it from being exposed to the outside of chassis member 14.

Forming groove 14B all around the periphery of chassis member 14 has another advantage; adhesive 17,which has flowed into groove 14B, becomes continuous state and is arranged at the periphery of chassis member 14, so that dissipation effect is highly expected all over the area of panel 10.

FIGS. 7A through 7E illustrate a bonding process of the panel and the chassis member of the plasma display device in the first embodiment. Here will be given the description of the bonding process.

Figure 7A:
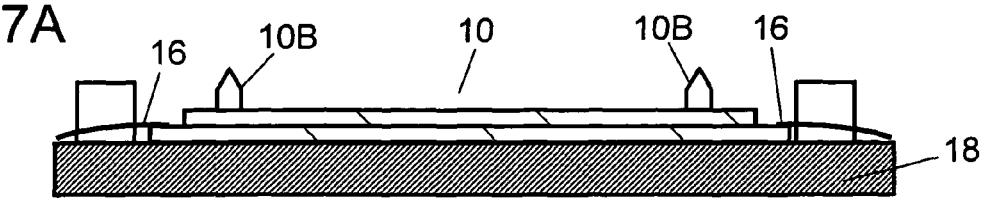
FIGS. 7A through 7E illustrate a bonding process of the panel and a chassis member of the plasma display device.
Figure 7B:
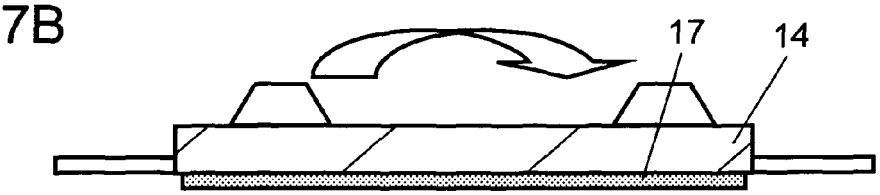

Panel 10 is properly positioned on lower die 18 of a pressing machine, as shown in FIG. 7A; meanwhile, as shown in FIG. 7B, pull-to-remove type adhesive 17 having thermal conductivity is applied to the surface—on which the panel is to be mounted—of chassis member 14. Panel 10 has chip tubes 10B on its backside. Through chip tubes 10B, the air confined in the space of panel 10 is exhausted outside and the discharge gas is encapsulated.

Figure 7C:
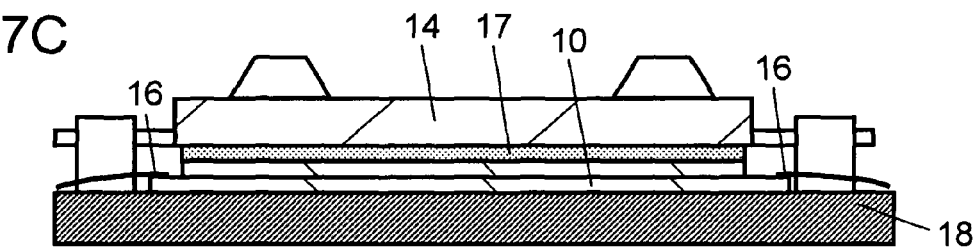

Following to the above, in a state where panel 10 is positioned under chassis member 14, chassis member 14 is turned over so that a side, where adhesive 17 applied, of chassis member 14 becomes a lower side. Then, as shown in FIG. 7C, chassis member 14 is put onto panel 10 with a careful alignment so that the adhesive-applied side faces panel 10.

Figure 7D:
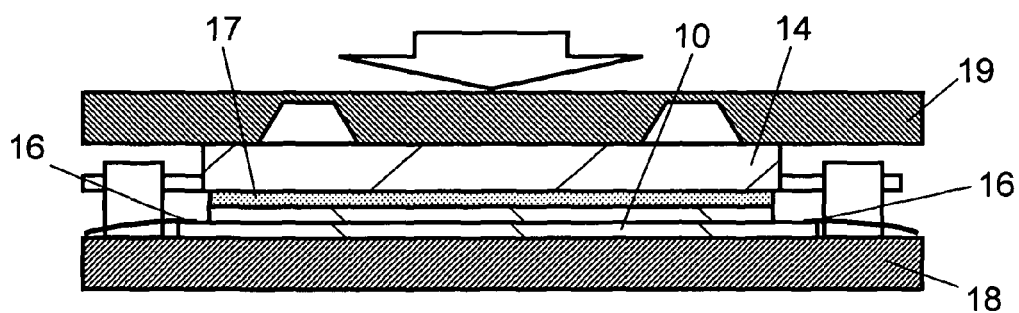

Next, as shown in FIG. 7D, pressing force is applied onto the chassis member 14 and panel with upper die 19, and at the same time, adhesive 17 is cured by the application of heat from a heater (not shown) located on upper die 19. Panel 10 and chassis member 14 are thus bonded with adhesive 17. The cure time should be less than 5 minutes.

Figure 7E:
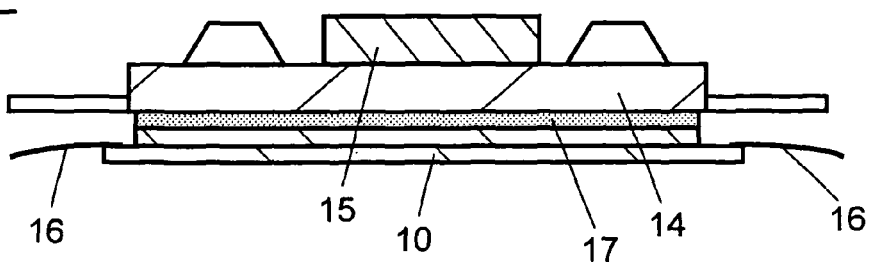

FIG. 7E shows bonded panel 10 and chassis member 14 on which circuit block 15 is mounted.

Figure 8:
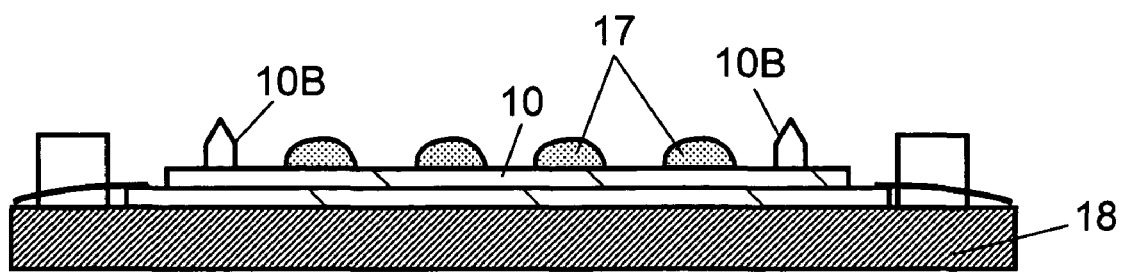
FIG. 8 shows another bonding process of the panel and the chassis member of the plasma display device.

FIG. 8 shows another bonding process of the panel and the chassis member of the plasma display device of the first embodiment. Although adhesive 17 is applied to chassis member 14 in the aforementioned process from FIG. 7A through FIG. 7E, it is not limited thereto; adhesive 17 may be applied to the back face (confronting the chassis member) of panel 10, as shown in FIG. 8.

When adhesive 17 is applied to chassis member 14, in the description above, it is preferable to heat panel 10. Heated panel 10 contributes to a further shortened cure time for adhesive 17 when the pressing force and heat are applied onto chassis member 14 by upper die 19 and the heater, as shown in FIG. 7D. It will be understood that chassis member 14 should be heated when adhesive 17 is applied to panel 10, as shown in FIG. 8.

Although panel 10 and chassis member 14 are fixed each other before being pressed and heated in the description above, it is not limited thereto; the fixing, and the application of pressing force and heat may be done at the same time.

According to the first embodiment, as described above, move-to-remove adhesive 17 having thermal conductivity is provided between panel 10 and chassis member 14. Pulling the exposed portion of adhesive 17 decreases the adhesive strength, so that panel 10 can be easily separated from chassis member 14 as a holder of the panel.

By carrying out the bonding process above, i.e., applying adhesive 17 to panel 10 or chassis member 14; putting panel 10 and chassis member 14 together; and curing adhesive 17 by the application of pressing force and heat, panel 10 and chassis member 14 can be bonded in a short time. Furthermore, a bonding—in which pressing and heating for cure proceed simultaneously—provides panel 10 and chassis member 14 with a perfect alignment and a uniformly maintained interval between panel 10 and chassis member 14. As a result, the bonding process completes in a short time and a uniform dissipation effect in panel 10, as a finished product, can be obtained.

According to the first embodiment, as described above, move-to-remove adhesive 17 having thermal conductivity is provided between panel 10 and chassis member 14. Pulling the exposed portion of adhesive 17 decreases the adhesive strength, so that panel 10 can be easily separated from chassis member 14 as a holder of the panel. Besides, groove 14B is disposed around the periphery of chassis member 14. Groove 14B prevents adhesive 17 from being exposed to the outside of chassis member 14.

Second Exemplary Embodiment

Figure 9:
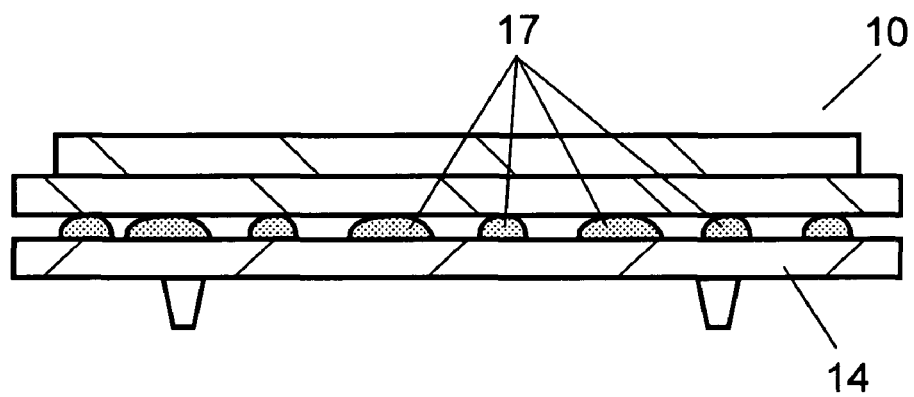
FIG. 9 is a section view taken along a line orthogonal to the adhesive applied to a plasma display panel of a second exemplary embodiment.
Figure 10:
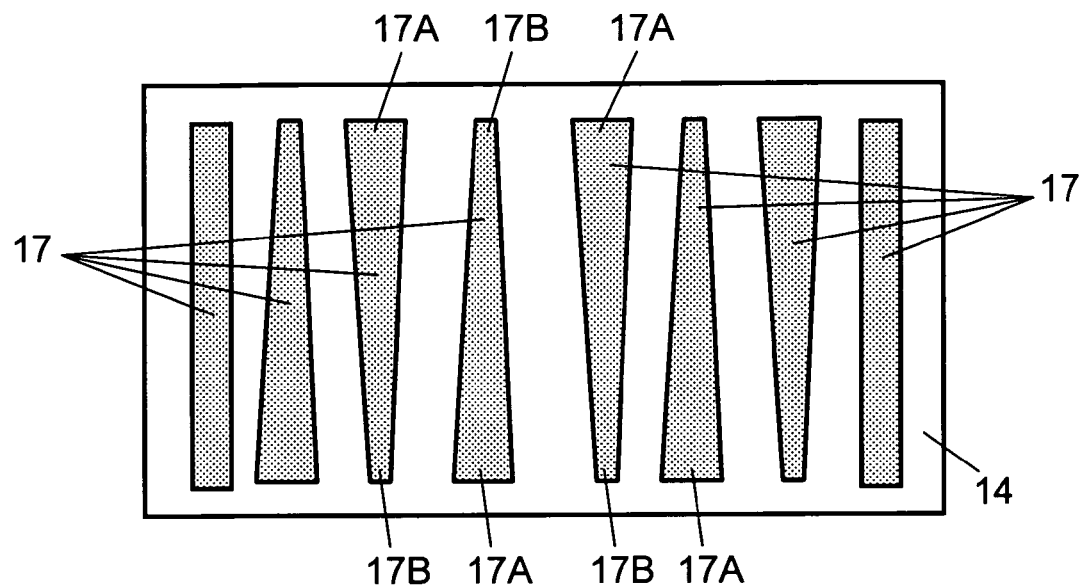
FIG. 10 is a plan view showing patterns where the adhesive is applied.

Next will be described the structure of the second exemplary embodiment. FIG. 9 is a section view taken along a line orthogonal to adhesive 17 applied to a plasma display panel of the second embodiment. FIG. 10 is a plan view showing patterns where the adhesive is applied.

Between panel 10 and chassis member 14, as shown in FIG. 9 and FIG. 10, adhesive 17 is provided in a rectangular shape where the width of the rectangular measured at remove-start point 17A—which is one end of the provided adhesive strip—gradually becomes smaller toward remove-end point 17B that is the other end of the strip of adhesive 17. Each strip is located on chassis member 14 so that remove-start point 17A and remove-end point 17B are alternately arranged with respect to the opposing sides of chassis member 14. That is, as shown in FIG. 10, the arrangement allows each strip to keep an interval substantially the same from the adjacent strip of adhesive 17. The adhesive strips at both ends of chassis member 14 may be provided to have a same width.

A strip of adhesive 17 should preferably be provided so that a portion of the adhesive (with few millimeters to few centimeters in length) comes out as an exposed tab from the bonded edges of panel 10 and chassis member 14. To separate panel 10 from chassis member 14, pulling the tab weakens the adhesion of adhesive 17, whereby panel 10 can be easily separated from chassis member 14.

To change the amount of adhesive 17 while the adhesive is applied to panel 10 or chassis member 14, there are some ways: changing the applying shape by a nozzle; changing the applying amount of the adhesive by controlling the moving speed of the nozzle; and changing the applying amount by changing the height of the nozzle kept at moving.

Figure 11A:
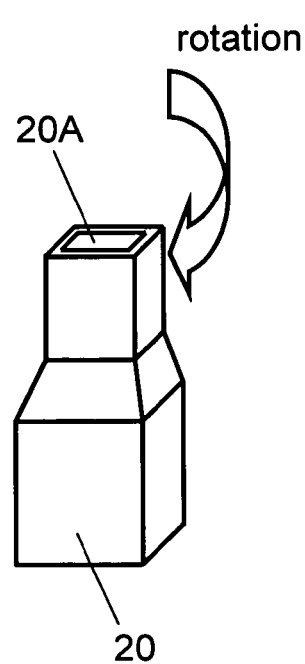
FIG. 11A is a perspective view of a nozzle for applying adhesive used in the second embodiment.
Figure 11B:
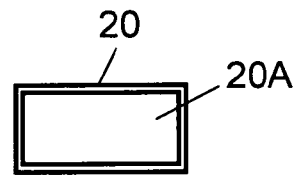
FIG. 11B shows the opening of the nozzle positioned at the start of the application of adhesive in the second embodiment.
Figure 11C:
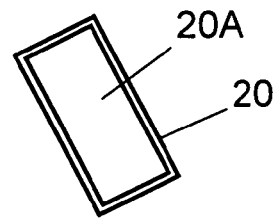
FIG. 11C shows the opening of the nozzle located in a twisted position in the second embodiment.

FIG. 11A is a perspective view of a nozzle for applying adhesive used in the second embodiment. FIG. 11B shows the opening of the nozzle positioned at the start of the application of adhesive in the second embodiment. FIG. 11C shows the opening of the nozzle located in a twisted position in the second embodiment.

In the description, as shown in FIG. 11A, nozzle 20 having rectangular opening 20A. When an operator moves nozzle 20, adhesive 17 is fed from opening 20A of the nozzle. At first, as shown in FIG. 11B, the operator sets opening 20A of the nozzle in lengthwise position and starts the applying adhesive. As the operator moves nozzle 20 toward the opposite end of chassis member 14, as shown in FIG. 11C, the operator twists nozzle 20 so that the strip shape fed from opening 20A gradually narrows. On the other hand, by starting nozzle 20 in an inclined position, the operator can form the width of the strip shape broader. In this way, the strip of adhesive 17 with a different width can be easily obtained.

According to the embodiment, as described above, a strip of adhesive 17 is formed so as to be wider toward remove-start point 17A. That is, a part closer to remove-end point 17B bonds to chassis member 14 with smaller area. Therefore, when the operator applies a pulling force to remove-start point 17A, such a tailed-off shape is thoroughly removable without tear-apart of the strip.

Third Exemplary Embodiment

Figure 12:
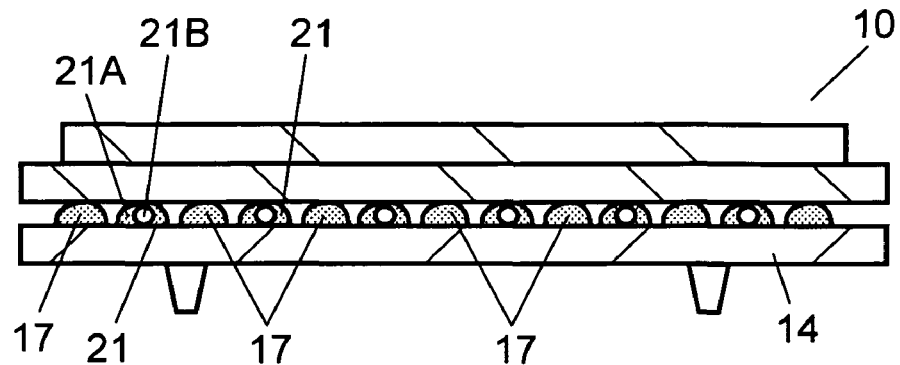
FIG. 12 is a section view taken along a line orthogonal to the adhesive applied to a plasma display panel of a third exemplary embodiment.
Figure 13:
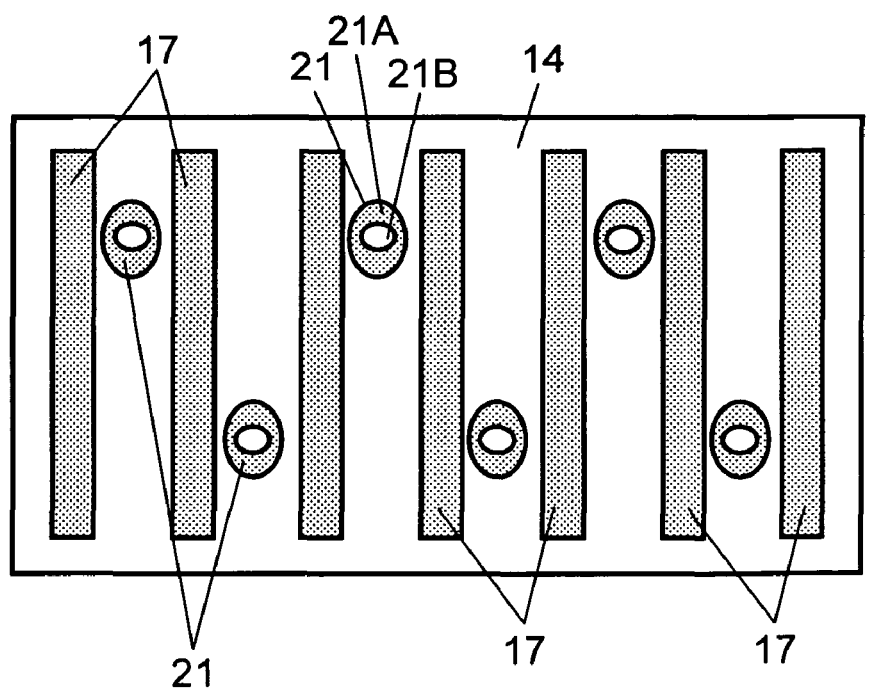
FIG. 13 is a plan view of the chassis member, with the adhesive provided areas shown in crosshatch pattern.

Next will be described the structure of the third exemplary embodiment. FIG. 12 is a section view taken along a line orthogonal to adhesive 17 applied to a plasma display panel of the third embodiment. FIG. 13 is a plan view of the chassis member, with adhesive 17 provided areas shown in cross-hatch pattern.

A plurality of strips of adhesive 17 is, as shown in FIGS. 12 and 13, disposed at predetermined spaced intervals between panel 10 and chassis member 14. To properly keep the gap between panel 10 and chassis member 14, a plurality of spacers 21 is disposed between the strips of adhesive 17. Each spacer 21 is separately located pull-to-remove adhesive 21A in which beads 21B made of glass or resin are embedded.

Preferably, a strip of adhesive 17 should be provided so that a portion of the adhesive comes out from the bonded edges of panel 10 and chassis member 14 as an exposed tab with few millimeters to few centimeters in length. To separate panel 10 from chassis member 14, pulling the exposed tab weakens the adhesion of adhesive 17, whereby panel 10 can be easily separated from chassis member 14.

For positioning panel 10 and chassis member 14, temporarily fixing member used for temporary bonding of panel 10 and chassis member 14 may be used as an alternative of spacer 21. A double coated adhesive tape and UV-cured resin can be the temporarily fixing member.

As described above, according to the third embodiment, thermally conductive pull-to-remove adhesive 17 is disposed between panel 10 and chassis member 14. With the structure, applying a pulling force to a portion of adhesive 17 exposed from the edge of panel 10 weakens the adhesion of adhesive 17, whereby panel 10 can be easily separated from chassis member 14. Besides, spacer 21 disposed between the strips of adhesive 17 determines the gap between panel 10 and chassis member 14, keeping the adhesion between panel 10 and chassis member 14 to be substantially uniform. Therefore, when the operator applies a pulling force to the strip of adhesive 17, adhesive 17 is thoroughly removable without tear-apart of the strip.

Fourth Exemplary Embodiment

Figure 14:
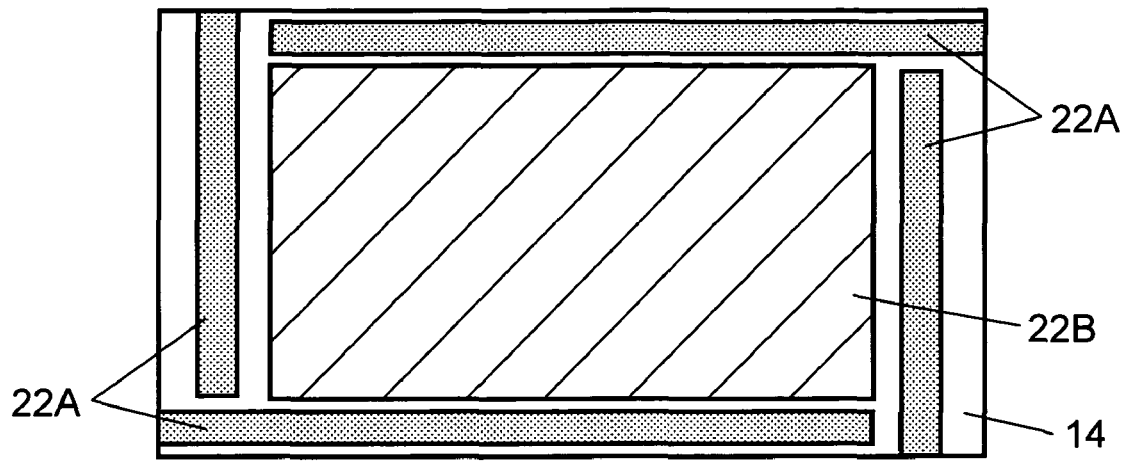
FIG. 14 is a plan view showing the adhesive provided area on the chassis member of a plasma display device of a fourth exemplary embodiment.

Now will be described the structure of the fourth exemplary embodiment. FIG. 14 is a plan view showing the adhesive provided area on the chassis member of a plasma display device of the fourth embodiment. The thermally conductive adhesive material of the embodiment includes, as shown in FIG. 14, pull-to-remove type adhesive 22A that fixes panel 10 with chassis member 14, and non-adhesive thermal conduction sheet 22B. Adhesive 22A is located around chassis member 14, while sheet 22B is laid on the inner area surrounded by adhesive 22A.

Pull-to-remove adhesive 22A is formed of, as mentioned earlier, acrylic-based, or silicon-based material having good thermal conductivity and perceptible flexibility. Adhesive 22A has a pressure sensitive adhesive layer. On the other hand, non-adhesive thermal conduction sheet 22B is formed of acrylic-based, or silicon-based sheet material having good thermal conductivity. The term "non-adhesive" mentioned above is not limited to the literally meaning; a material, which has an adhesion but removable with ease, is defined as a non-adhesive material in the description.

According to the fourth embodiment, pull-to-remove type thermal conductive adhesive 22A is disposed at the periphery of between panel 10 and chassis member 14, while non-adhesive thermal conduction sheet 22B covers the mid-area of chassis member 14. With the structure, pulling adhesive 22A at the edge of panel 10 weakens the adhesion of adhesive 22A, whereby panel 10 can be easily separated from chassis member 14. In a plasma display device typically used as a big-sized screen, applying adhesive 22A to all over the area of chassis member 14 has a problem-when adhesive 22 is pulled to remove, the adhesive may not thoroughly removable due to being torn-off. In the embodiment, however, the structure having adhesive 22A at the periphery only has no worry about the problem.

Fifth Exemplary Embodiment

Figure 15:
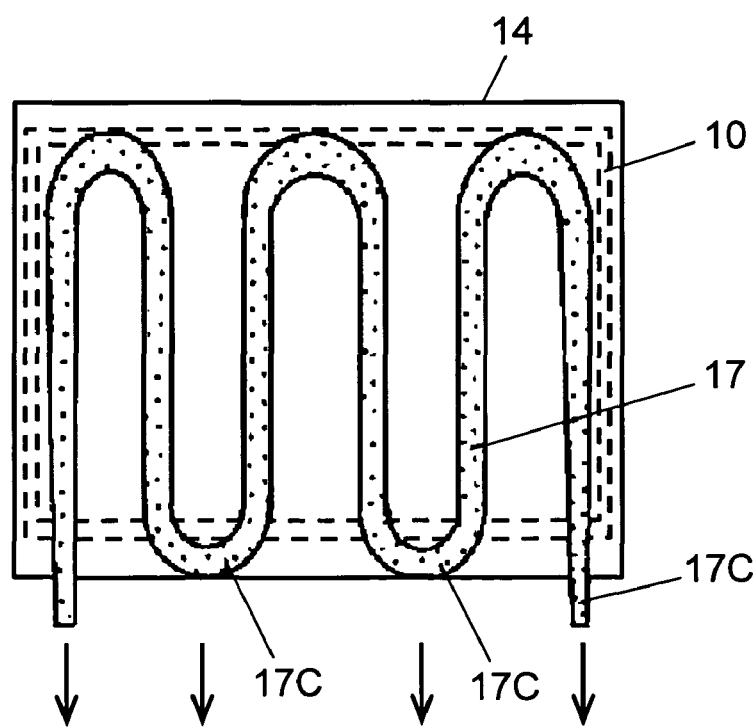
FIG. 15 is a plan view showing the adhesive provided area on the chassis member of a plasma display device of a fifth exemplary embodiment.
Figure 16:
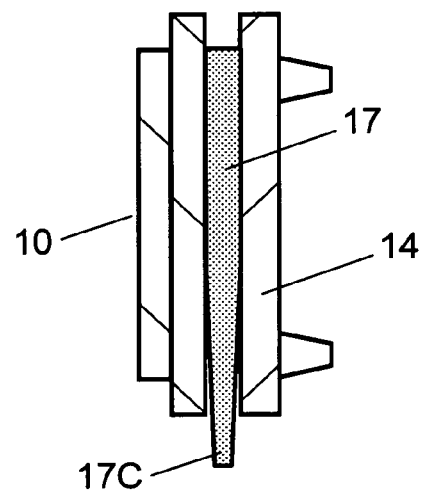
FIG. 16 is a section view showing the adhesive provided in the plasma display device.

Next will be described the fifth exemplary embodiment. FIG. 15 is a plan view showing adhesive 17 provided area on the chassis member of a plasma display device of the fifth embodiment. FIG. 16 is a section view showing adhesive 17 provided in the plasma display device. According to the embodiment, as shown in FIG. 15, adhesive 17 is disposed between panel 10 and chassis member 14 so as to be a serpentine shape. Besides, Adhesive 17 is provided so that a portion of the adhesive (with few millimeters to few centimeters in length) comes out as exposed tab 17D from the edges of panel 10 and chassis member 14. To separate panel 10 from chassis member 14, as shown in FIG. 15 and FIG. 16, pulling tab 17C weakens the adhesion of adhesive 17, whereby panel 10 can be easily separated from chassis member 14.

Figure 17:
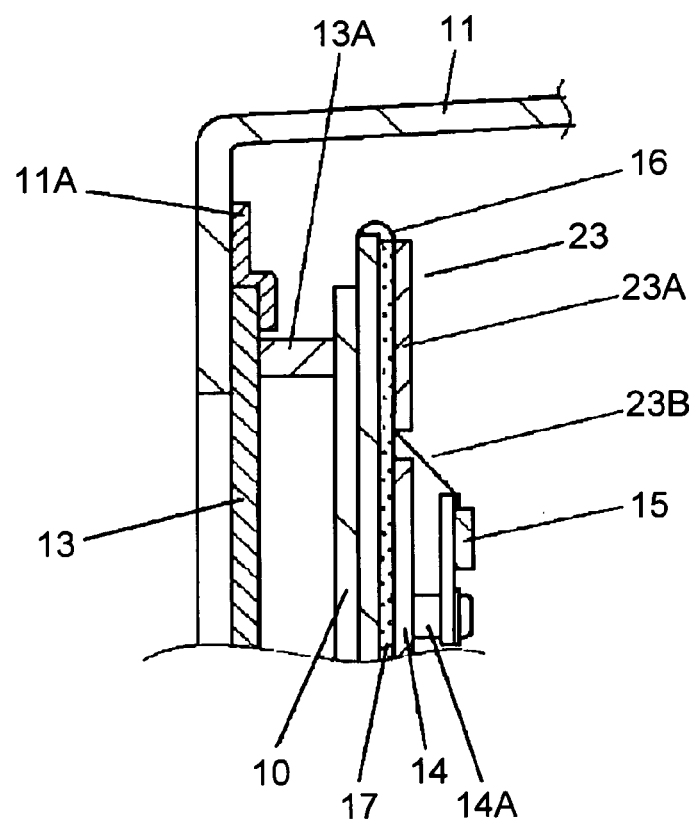
FIG. 17 is a section view illustrating an in-detail structure of the joint section between a flexible wiring board and a circuit block of the fifth embodiment.

FIG. 17 is a section view illustrating an in-detail structure of the joint section between a flexible wiring board and a circuit block of the fifth embodiment. In FIG. 17, data driver 23 is the driving circuit block that supplies panel 10 with a display signal. Cooling plate 23A of data driver 23 contains a semiconductor device (not shown) for feeding a display signal to panel 10. Data driver 23 is connected not only to panel 10 via flexible wiring board 16, but also to circuit block 15 via flexible wiring board 23B of data driver 23. Cooling plate 23A of data driver 23 is bonded onto exposed tab 17C, which is a portion of adhesive 17 coming out from the edge of chassis member 14. The structure allows the heat generated in data driver 23 to dissipate through adhesive 17 having a good thermal conductivity.

In FIG. 17, bracket 11A fixes front cover 13 with front flame 11. Spacer 13 is disposed between panel 10 and front cover 13.

The heat generated in panel 10 is, as described above, transmitted to chassis member 14 through adhesive 17. According to the structure of the embodiment, a portion of adhesive 17 is exposed as exposed tab 17C, on which, cooling plate 23A is bonded, and further on which data driver 23 is mounted. The structure allows the heat generated in driver 23 to dissipate with efficiency.

Moreover, in the embodiment, thermally conductive pull-to-remove type adhesive 17 is disposed between panel 10 and chassis member 14 so as to be a serpentine shape. Besides, Adhesive 17 is provided so that a portion of the adhesive comes out as exposed tab 17C from the edges of panel 10 and chassis member 14. To separate panel 10 from chassis member 14, pulling tab 17C weakens the adhesion of adhesive 17, whereby panel 10 can be easily separated from chassis member 14.

Sixth Exemplary Embodiment

Figure 18:
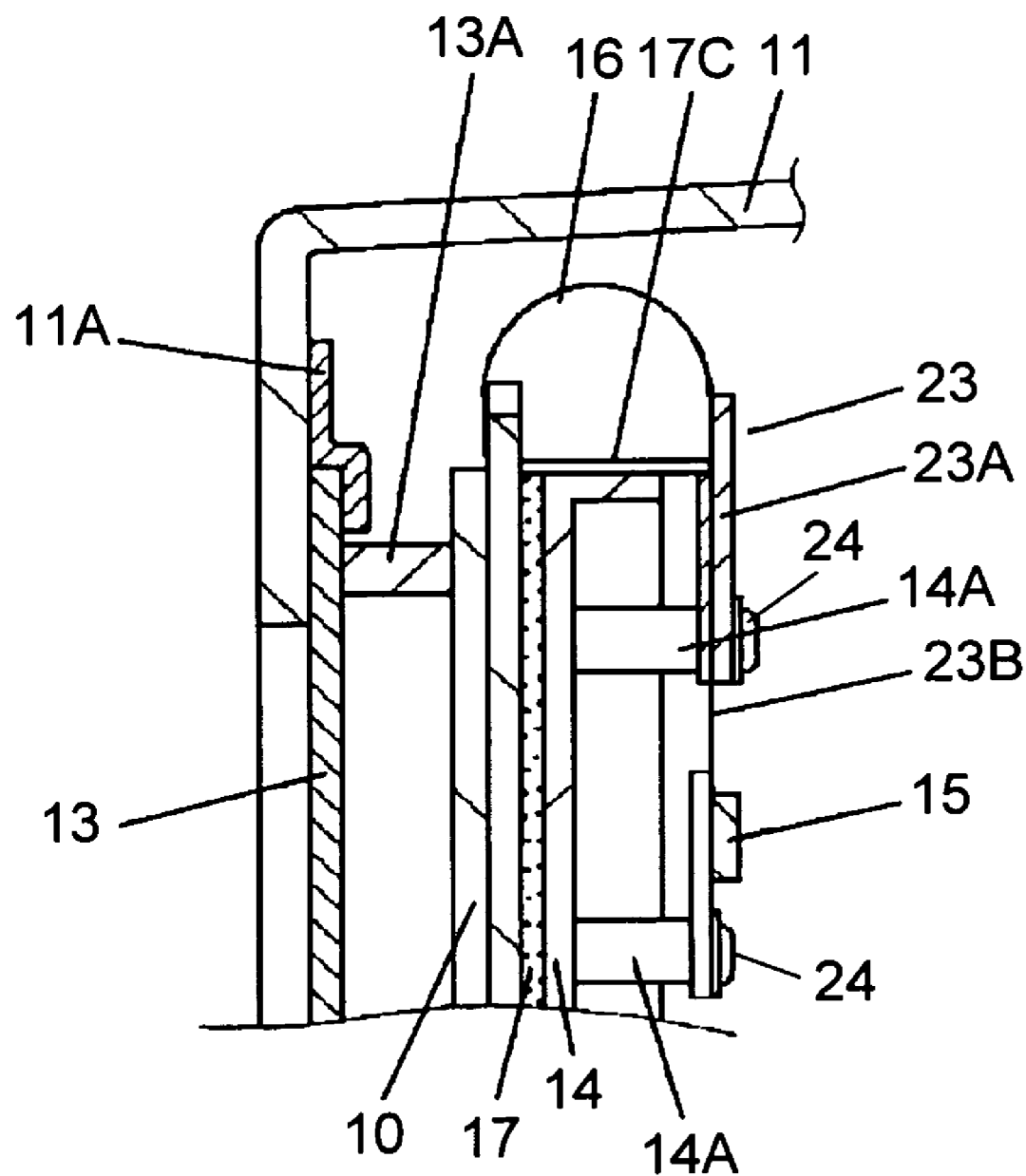
FIG. 18 is a section view illustrating an in-detail structure of the joint section between a flexible wiring board and a circuit block of a sixth exemplary embodiment.

Next will be described the sixth exemplary embodiment. FIG. 18 is a section view illustrating an in-detail structure of the joint section between a flexible wiring board and a circuit block of the sixth embodiment. As shown in FIG. 18, data driver 23 is attached to chassis member 14 in such a way that cooling plate 23A is secured to bosses 14A of chassis member 14 with screws 24. Exposed tab 17C of adhesive 17 extends and reaches one surface of cooling plate 23A of data driver 23, which allows the heat generated in data driver 23 to transmit to chassis member 14 through adhesive 17 having a good thermal conductivity.

The heat generated in panel 10 is, as described above, transmitted to chassis member 14 through adhesive 17. According to the structure of the sixth embodiment, a portion of adhesive 17 is exposed as exposed tab 17C and is extended to cooling plate 23A of data driver 23. That is, the heat generated in data driver 23 can be effectively dissipated through exposed tab 17C located between cooling plate 23A and chassis member 14.

INDUSTRIAL APPLICABILITY

According to the manufacturing method of the present invention, as described above, in the case that a plasma display device no longer works as a product, the panel and the holding plate can be easily separated. This greatly contributes to recycling of products. Besides, the manufacturing method accelerates the bonding process of the panel and the holding plate.

REFERENCE MARKS IN THE DRAWINGS

10: panel
14: chassis member
17: adhesive

The invention claimed is:

1. A method of manufacturing a plasma display device having a panel in which a pair of substrates having transparency at least on a front side, the substrates being oppositely disposed so that a discharge space and discharge cells are formed between the substrates, a metallic holding plate that supports the panel via a thermal conductive material, and a driving circuit block containing a semiconductor device for feeding a display signal to the panel, the method comprising:
   forming the thermal conductive material of a pull-to-remove type adhesive;
   applying the adhesive to one of the panel and the holding plate, and applying pressure to the panel and the holding plate for forming a bulging-out portion of the adhesive bulging out from between the panel and the plate;
   curing the adhesive for bonding the panel and the holding plate together;
   wherein the bulging-out portion is formed by bulging out from a part of the holding plate, and the driving circuit block is in contact with the bulging out portion bulging out from between the panel and the holding plate.

2. The method of manufacturing the plasma display device of claim 1, wherein the driving circuit block is mounted on a cooling plate on a back side of the holding plate, a portion of the thermal conductive material is exposed from the holding plate, and the driving circuit block-mounted cooling plate is bonded with the exposed portion of the thermal conductive material.

3. The method of manufacturing the plasma display device of claim 1, wherein the driving circuit block is mounted on a cooling plate on a back side of the holding plate, a portion of the thermal conductive material is extended to the driving circuit block-mounted cooling plate.

4. The method of manufacturing the plasma display device of claim 1, further comprising pulling the bulging-out portion to allow the panel to be removed from the holding plate.

5. The method according to claim 1, wherein heat and pressure are used to cure the adhesive.

* * * * *